(12) United States Patent
Ohtomo et al.

(10) Patent No.: US 11,598,854 B2
(45) Date of Patent: Mar. 7, 2023

(54) SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 981 days.

(21) Appl. No.: 16/398,437

(22) Filed: Apr. 30, 2019

(65) Prior Publication Data
US 2019/0346539 A1     Nov. 14, 2019

(30) Foreign Application Priority Data
May 10, 2018    (JP) .............................. JP2018-091066

(51) Int. Cl.
*G01S 7/481*     (2006.01)
*G02B 26/10*     (2006.01)
(Continued)

(52) U.S. Cl.
CPC ............ *G01S 7/4817* (2013.01); *G01S 7/484* (2013.01); *G01S 17/10* (2013.01); *G02B 26/101* (2013.01); *G02B 26/108* (2013.01)

(58) Field of Classification Search
CPC .... G01S 7/4811; G01S 7/4812; G01S 7/4817; G01S 7/483; G01S 7/484; G01S 17/04;
(Continued)

(56) References Cited

U.S. PATENT DOCUMENTS

| 4,401,886 A * | 8/1983 | Pond ....................... G01S 17/66 |
| | | 250/203.1 |
| 6,371,405 B1 * | 4/2002 | Sallee ................... F41G 7/2246 |
| | | 342/63 |

(Continued)

FOREIGN PATENT DOCUMENTS

| JP | 2006-125885 A | 5/2006 |
| JP | 2016-138802 A | 8/2016 |

(Continued)

*Primary Examiner* — Daniel L Murphy
(74) *Attorney, Agent, or Firm* — Nields, Lemack & Frame, LLC (57) ABSTRACT

A surveying system comprises an object to be measured having a retro-reflector and a surveying instrument main body for emitting a distance measuring light and performing a measurement based on a reflected distance measuring light, wherein the surveying instrument main body comprises a distance measuring light projecting module, a photodetector, a measuring unit, an optical axis deflector which has a reference optical axis and deflects a distance measuring optical axis, a projecting direction detecting module which detects a deflection angle and a deflection angle direction of the distance measuring optical axis, and an arithmetic control module, and wherein the arithmetic control module is configured to control the optical axis deflector, to perform a two-dimensional scan with the distance measuring light, to detect the deflection angle direction of the distance measuring light at a moment of detecting a photodetecting signal by the projecting direction detecting module, and to move an approximate center of the two-dimensional scan in the detected deflection angle direction.

6 Claims, 7 Drawing Sheets

(51) Int. Cl.
*G01S 7/484* (2006.01)
*G01S 17/10* (2020.01)

(58) Field of Classification Search
CPC .......... G01S 17/06; G01S 17/08; G01S 17/89;
G01S 17/42; G01S 17/66; G01S 17/86;
G01S 7/4972; G02B 26/101; G02B
26/108; G01C 1/02; G01C 15/002
USPC ........................................................ 356/5.01
See application file for complete search history.

(56) References Cited

U.S. PATENT DOCUMENTS

| | | | | |
|---|---|---|---|---|
| 2003/0169414 | A1* | 9/2003 | Benz | G01C 15/002 356/141.5 |
| 2015/0015700 | A1* | 1/2015 | Becker | H04N 5/247 348/136 |
| 2016/0216109 | A1 | 7/2016 | Kumagai et al. | |
| 2016/0238385 | A1* | 8/2016 | Ohtomo | G01S 7/4817 |
| 2016/0238708 | A1* | 8/2016 | Ohtomo | G01C 9/06 |
| 2016/0259039 | A1 | 9/2016 | Ohtomo et al. | |
| 2017/0003372 | A1* | 1/2017 | Antoina | G01S 17/66 |
| 2017/0108528 | A1* | 4/2017 | Atlas | G01P 13/025 |
| 2017/0138730 | A1 | 5/2017 | Ohtomo et al. | |
| 2017/0168142 | A1 | 6/2017 | Kumagai et al. | |
| 2017/0227357 | A1 | 8/2017 | Ohtomo et al. | |
| 2018/0284282 | A1* | 10/2018 | Hong | G02B 26/108 |
| 2020/0033454 | A1* | 1/2020 | Hong | G01S 7/4865 |

FOREIGN PATENT DOCUMENTS

| | | |
|---|---|---|
| JP | 2016-151422 A | 8/2016 |
| JP | 2016-151423 A | 8/2016 |
| JP | 2016-161411 A | 9/2016 |
| JP | 2017-96629 A | 6/2017 |
| JP | 2017-106813 A | 6/2017 |
| JP | 2017-142081 A | 8/2017 |

\* cited by examiner

SURVEYING SYSTEM

BACKGROUND OF THE INVENTION

The present invention relates to a surveying system having a tracking function and a searching function.

As a surveying system having a tracking function, there is a total station. The total station sights an object to be measured by a telescope with high magnification which also serves as a distance measuring optical system, performs a measurement and further horizontally rotates/vertically rotates the telescope, sequentially sights different objects to be measured and performs a measurement per each of the different objects to be measured. Alternatively, the total station follows up a movement of the object to be measured, horizontally rotates/vertically rotates the telescope, sights the object to be measured, and performs a measurement while tracking the object to be measured.

However, a magnification of the telescope is high, a field angle is as very narrow as approximately 2°, and an inertia of the telescope itself is large. For this reason, at a time of changing the object to be measured, it is difficult to rotate the telescope at a high speed, rapidly capture the object to be measured and sight the object to be measured. Further, in a case where the object to be measured moves and the object to be measured is to be tracked, the telescope cannot follow up the movement, and the object to be measured may go out of a visual field of the telescope in a case where the movement of the object to be measured is rapid. When the object to be measured once goes out of the visual field, the telescope with a large inertia is rotated and the object to be measured is searched, but since the field angle of the telescope is narrow, it takes much time to capture the object to be measured, which causes a deterioration in a workability of the measurement.

SUMMARY OF THE INVENTION

It is an object of the present invention to provide a surveying system which enables to search and track an object to be measured in a wide range at a high speed.

To attain the object as described above, a surveying system according to the present invention comprises an object to be measured having a retro-reflector and a surveying instrument main body for emitting a distance measuring light and performing a measurement of the object to be measured based on a reflected distance measuring light from the retro-reflector, wherein the surveying instrument main body comprises a distance measuring light projecting module which has a light emitter for emitting the distance measuring light and projects the distance measuring light onto a distance measuring optical axis, a light receiving module which has a photodetector for receiving the reflected distance measuring light and producing a photodetecting signal, a measuring unit which performs a distance measurement of the object to be measured based on the photodetecting signal from the photodetector, an optical axis deflector which has a reference optical axis and deflects the distance measuring optical axis with respect to the reference optical axis, a projecting direction detecting module which detects a deflection angle and a deflection angle direction of the distance measuring optical axis with respect to the reference optical axis, and an arithmetic control module which controls a deflecting action of the optical axis deflector and a distance measuring operation of the measuring unit, wherein the optical axis deflector comprises a pair of optical prisms which are rotatable around the reference optical axis and motors which individually independently rotate the optical prisms, and wherein the arithmetic control module is configured to control a deflection by the optical axis deflector by controlling a rotating direction, a rotating speed, and a rotation ratio of the pair of optical prisms, to perform a two-dimensional scan with the distance measuring light with the distance measuring optical axis as an approximate center, to detect the deflection angle direction of the distance measuring light at a moment of detecting the photodetecting signal during the two-dimensional scan by the projecting direction detecting module, and to control the optical axis deflector in such a manner that the approximate center of the two-dimensional scan moves in the detected deflection angle direction.

Further, in the surveying system according to a preferred embodiment, in a case where two or more photodetecting signals are detected during the two-dimensional scan, the arithmetic control module averages the deflection angle directions detected by the projecting direction detecting module based on each of the photodetecting signals and controls the optical axis deflector in such a manner that the approximate center of the two-dimensional scan moves in an averaged deflection angle direction.

Further, in the surveying system according to a preferred embodiment, the arithmetic control module moves a predetermined two-dimensional scan pattern in at least one of a horizontal direction and a vertical direction and searches the object to be measured while scanning with the predetermined two-dimensional scan pattern.

Further, in the surveying system according to a preferred embodiment, the arithmetic control module is configured to control the optical axis deflector in such a manner that a two-dimensional scan pattern is moved in a vertical direction as an initial search pattern which is flat in a horizontal direction at a start of searching for the object to be measured and the two-dimensional scan pattern becomes a search pattern which is flat in a vertical direction after detecting the object to be measured.

Further, in the surveying system according to a preferred embodiment, the optical axis deflector is configured to control the two-dimensional scan with a scan pattern having an intersection at which an outward and an inward of the two-dimensional scan cross each other.

Further, in the surveying system according to a preferred embodiment, the arithmetic control module is configured to detect the photodetecting signal while performing the two-dimensional scan and to track the object to be measured based on a detection result.

Furthermore, in the surveying system according to a preferred embodiment, the arithmetic control module is configured to control the optical axis deflector in such a manner that a two-dimensional scan pattern becomes a scan pattern which is flat in a horizontal direction in a state where the object to be measured is tracked and the two-dimensional scan pattern becomes a scan pattern which is flat in a vertical direction after an end of a tracking.

According to the present invention, the surveying system comprises an object to be measured having a retro-reflector and a surveying instrument main body for emitting a distance measuring light and performing a measurement of the object to be measured based on a reflected distance measuring light from the retro-reflector, wherein the surveying instrument main body comprises a distance measuring light projecting module which has a light emitter for emitting the distance measuring light and projects the distance measuring light onto a distance measuring optical axis, a light receiving module which has a photodetector for receiving the reflected distance measuring light and producing a photodetecting signal, a measuring unit which performs a distance measurement of the object to be measured based on the photodetecting signal from the photodetector, an optical axis deflector which has a reference optical axis and deflects the distance measuring optical axis with respect to the reference optical axis, a projecting direction detecting module which detects a deflection angle and a deflection angle direction of the distance measuring optical axis with respect to the reference optical axis, and an arithmetic control module which controls a deflecting action of the optical axis deflector and a distance measuring operation of the measuring unit, wherein the optical axis deflector comprises a pair of optical prisms which are rotatable around the reference optical axis and motors which individually independently rotate the optical prisms, and wherein the arithmetic control module is configured to control a deflection by the optical axis deflector by controlling a rotating direction, a rotating speed, and a rotation ratio of the pair of optical prisms, to perform a two-dimensional scan with the distance measuring light with the distance measuring optical axis as an approximate center, to detect the deflection angle direction of the distance measuring light at a moment of detecting the photodetecting signal during the two-dimensional scan by the projecting direction detecting module, and to control the optical axis deflector in such a manner that the approximate center of the two-dimensional scan moves in the detected deflection angle direction. As a result, it is possible to search the object to be measured in the wide range, and a search can be performed at the high speed.

DETAILED DESCRIPTION OF THE PREFERRED EMBODIMENT

A description will be given below on an embodiment of the present invention by referring to the attached drawings.

A surveying instrument system according to the embodiment of the present invention will be described by FIG. 1, FIG. 2, and FIG. 3.

Figure 1:
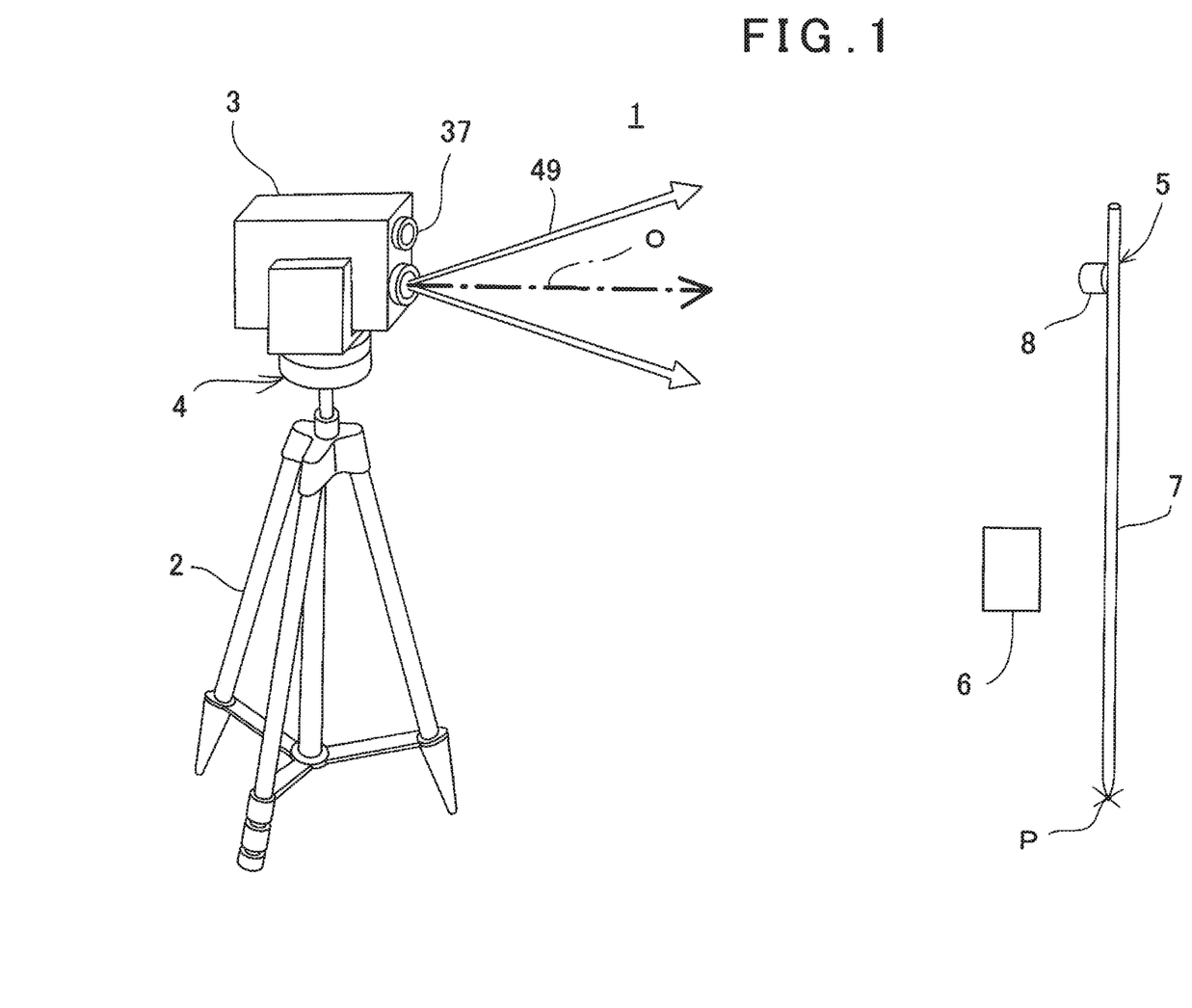
FIG. 1 is a schematical perspective view of a surveying system according to an embodiment of the present invention.
Figure 2:
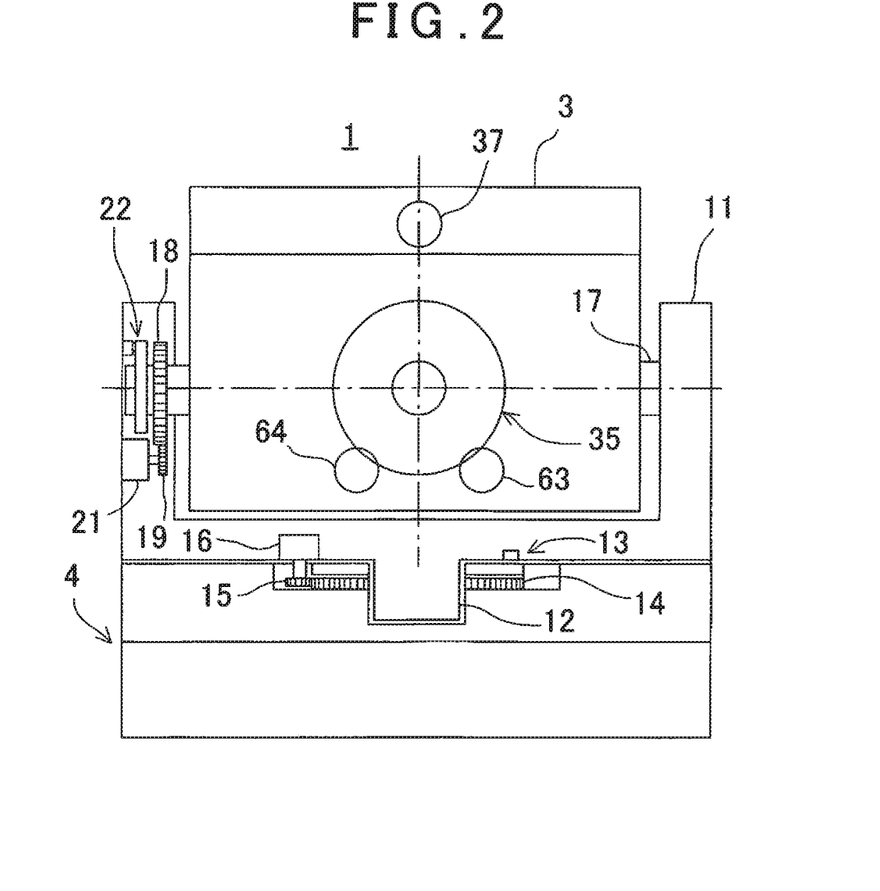
FIG. 2 is a front view of a surveying instrument main body in the surveying system.

In FIG. 1, reference numeral 1 denotes a surveying instrument system, reference character O denotes a distance measuring optical axis in a state where an optical axis is not deflected, and the distance measuring optical axis at this time is made a reference optical axis.

The surveying system 1 mainly has a tripod 2 as a supporting unit, a surveying instrument main body 3 as an electronic distance meter, an installation base 4 on which the surveying instrument main body 3 is mounted, a target instrument 5 installed at a measuring point P, and a terminal 6 capable of remotely operating the surveying instrument main body 3.

As the terminal 6, a device which is handheld and has a display function, a communicating function and an arithmetic processing function, for instance, a smartphone, a tablet, a notebook computer, or the like is used, and the terminal 6 transmits an instruction regarding a measurement to the surveying instrument main body 3, receives measurement data, image data, or the like, as acquired by the surveying instrument main body 3, and executes a data storage, a data display, a data processing, and the like.

The installation base 4 is mounted on an upper end of the tripod 2, and the surveying instrument main body 3 is provided on the installation base 4. The installation base 4 rotatably supports the surveying instrument main body 3.

The target instrument 5 has a pole 7 of which a lower end is a sharp tip and which indicates a measuring point P with the lower end, and has an object to be measured 8 provided at a predetermined position on the pole 7. The object to be measured 8 has optical characteristics which retro-reflect a distance measuring light emitted from the surveying instrument main body 3, and a corner cube, an omnidirectional prism, a target plate with a reflection sheet bonded thereto, or the like is used as the object to be measured 8. It is to be noted that, in FIG. 1, a corner cube is shown as the object to be measured. Further, a distance and a positional relationship between a center of the object to be measured (a measurement reference position) and the lower end of the pole 7 are known.

A frame unit 11 is provided on the installation base 4 in such a manner capable of rotating in a horizontal direction. A horizontal rotation shaft 12 is projected from a lower surface of the frame unit 11, and the horizontal rotation shaft 12 is rotatably fitted to the installation base 4 via a bearing (not shown). The frame unit 11 is rotatable around the horizontal rotation shaft 12 in the horizontal direction.

Further, a horizontal angle detector 13 (an encoder, for example) which detects a horizontal angle (an angle in a rotating direction around the horizontal rotation shaft 12) is provided between the horizontal rotation shaft 12 and the installation base 4. A relative rotation angle of the frame unit 11 in the horizontal direction with respect to the installation base 4 is detected by the horizontal angle detector 13.

A horizontal rotation gear 14 is fixed to the installation base 4 concentrically with the horizontal rotation shaft 12, and a horizontal pinion gear 15 is meshed with the horizontal rotation gear 14. A horizontal motor 16 as a horizontal rotary driving module is provided on the frame unit 11, an output shaft of the horizontal motor 16 is projected downward, and the horizontal pinion gear 15 is fixed to the output shaft of the horizontal motor 16.

The horizontal pinion gear 15 is rotated by driving of the horizontal motor 16 and the horizontal pinion gear 15 revolves around the horizontal rotation gear 14. Further, since the horizontal motor 16, the frame unit 11 and the surveying instrument main body 3 are integrated, the surveying instrument main body 3 is rotated around the horizontal shaft 12 by the horizontal motor 16 in the horizontal direction.

The frame unit 11 has a recess shape having a recess portion and the surveying instrument main body 3 is accommodated in the recess portion. The surveying instrument main body 3 is supported by the frame unit 11 via a vertical rotation shaft 17 which has a horizontal axis extending in the horizontal direction, and the surveying instrument main body 3 is capable of rotating freely in the vertical direction around the vertical rotation shaft 17.

A vertical rotation gear 18 is fixed to one end of the vertical rotation shaft 17, and a pinion gear 19 is meshed with the vertical rotation gear 18. A vertical motor 21 provided on the frame unit 11 as a vertical rotary driving module, and the pinion gear 19 is fixed to an output shaft of a vertical motor 21. When the vertical motor 21 is driven, the surveying instrument main body 3 is rotated in the vertical direction via the pinion gear 19, the vertical rotation gear 18, and the vertical rotation shaft 17.

Further, a vertical angle detector 22 (an encoder, for example) for detecting a vertical angle (an angle in the rotating direction around the vertical rotation shaft 17) is provided between the vertical rotation shaft 17 and the frame unit 11. A relative rotation angle of the surveying instrument main body 3 in the vertical direction with respect to the frame unit 11 is detected by the vertical angle detector 22.

The horizontal motor 16, the vertical motor 21, the horizontal angle detector 13 and the vertical angle detector 22 are electrically connected to an arithmetic control module 28 (to be described later), and the horizontal motor 16 and the vertical motor 21 are driven/controlled by the arithmetic control module 28 in such a manner that a required rotation amount is obtained at a required timing.

The rotation amount of the horizontal motor 16 (that is, a horizontal angle of the frame unit 11) is detected by the horizontal angle detector 13. The rotation amount of the vertical motor 21 (that is, a vertical angle of the surveying instrument main body 3) is detected by the vertical angle detector 22.

The detection results of the horizontal angle detector 13 and the vertical angle detector 22 are input into the arithmetic control module 28, respectively. It is to be noted that a rotary driving module is configured by the horizontal motor 16 and the vertical motor 21. Further, an angle detector for detecting the vertical rotation angle and the horizontal rotation angle of the surveying instrument main body 3, that is, a directional angle detector is configured by the horizontal angle detector 13 and the vertical angle detector 22.

A description will be given on an outline configuration of the surveying instrument main body 3 by referring to FIG. 3.

The surveying instrument main body 3 includes a distance measuring light projecting module 25, a light receiving module 26, a distance measurement calculating module 27, an arithmetic control module 28, a storage module 29, an image pickup control module 31, an image processing module 32, a communication module 33, an optical axis deflector 35, an attitude detector 36, a measuring direction image pickup module 37, a projecting direction detecting module 38, and a motor driver 39, and they are accommodated in a casing 41 and integrated. It is to be noted that, the distance measuring light projecting module 25, the light receiving module 26, the distance measurement calculating module 27, the optical axis deflector 35 and the like make up a distance measuring unit 42 which functions as an electronic distance meter.

The distance measuring light projecting module 25 has a projection optical axis 44, and a light emitter 45, for instance, a laser diode (LD), is disposed on the projection optical axis 44 as a distance measuring light source. Further, a projecting lens 46 is disposed on the projection optical axis 44. Further, a first reflection mirror 47 is disposed on the projection optical axis 44 as a deflecting optical component. A second reflection mirror 48, as a deflecting optical component, is disposed at a position where the projection optical axis 44 as defected by the first reflection mirror 47 crosses a light receiving optical axis 51 (to be described later). The projection optical axis 44 is deflected by the second reflection mirror 48 so as to coincide with the light receiving optical axis 51. The first reflection mirror 47 and the second reflection mirror 48 make up a projection optical axis deflector.

A CPU specialized for this instrument or a general-purpose CPU is used as the distance measurement calculating module 27. The distance measurement calculating module 27 drives the light emitter 45, and the light emitter 45 emits a laser beam. The distance measuring light projecting module 25 projects the laser beam emitted from the light emitter 45 as a distance measuring light 49. It is to be noted that, as the laser beam, any one of a continuous light or a pulsed light or an intermittent modulated light (that is, a burst-emitted light) disclosed in Japanese Unexamined Patent Application Publication No. 2016-161411 may be used.

A description will be given on the light receiving module 26. The light receiving module 26 has an optical system and a photodetector for receiving a reflected distance measuring light 52 from an object to be measured 8. The light receiving module 26 has the light receiving optical axis 51, and the light receiving optical axis 51 coincides with the projection optical axis 44 deflected by the first reflection mirror 47 and the second reflection mirror 48. It is to be noted that an axis of a state where the projection optical axis 44 coincides with the light receiving optical axis 51 is a distance measuring optical axis 53.

The optical axis deflector 35 is disposed on the reference optical axis O. The optical axis deflector 35 deflects a laser beam, which is transmitted through the optical axis deflector 35, by an optical action of a prism (to be described later). A straight optical axis transmitted through a center of the optical axis deflector 35 is the reference optical axis O. The reference optical axis O coincides with the projection optical axis 44, the light receiving optical axis 51 or the distance measuring optical axis 53 when they are not deflected by the optical axis deflector 35.

The reflected distance measuring light 52 is transmitted through the optical axis deflector 35 and is incident to the light receiving module 26. Further, a focusing lens 54 is disposed on the light receiving optical axis 51, and a photodetector 55 such as a photodiode (PD) or an avalanche photodiode (APD) is provided on the light receiving optical axis 51.

The focusing lens 54 focuses the reflected distance measuring light 52 on the photodetector 55. The photodetector 55 receives the reflected distance measuring light 52 and produces a photodetecting signal. The photodetecting signal is inputted into the distance measurement calculating module 27, and the distance measurement calculating module 27 calculates a reciprocating time of the distance measuring light based on the photodetecting signal and measures a distance to the object to be measured 8 based on the reciprocating time and the light velocity.

The communication module 33 transmits image data acquired by the measuring direction image pickup module 37, image data processed by the image processing module 32, and distance measurement data acquired by the distance measuring unit 42 to the terminal 6 and receives data such an operation command or the like from the terminal 6.

As the storage module 29, a storage medium such as an HDD, a semiconductor memory, a memory card, a CD, or a DVD is used. In the storage module 29, various types of programs are stored. These programs include an image pickup control program, an image processing program, a distance measuring program, a display program, a communication program, an operation command creating program, a tilt angle calculation program for calculating a tilt angle and a tilt direction of the surveying instrument main body 3 based on an attitude detection result from the attitude detector 36, a measurement program for carrying out the distance measurement, a deflection control program for controlling a deflecting operation of the optical axis deflector 35, a calculation program for executing various types of calculations, a searching program for searching the object to be measured, a tracking program for tracking the object to be measured, and the like.

Further, in the storage module 29, various types of data, such as the measurement data, angle measurement data, and the image data are stored.

As the arithmetic control module 28, a CPU specialized for this instrument, a general-purpose CPU, or the like is used. The arithmetic control module 28 develops and executes the various types of programs according to an operating state of the surveying instrument main body 3, performs a control of the distance measuring light projecting module 25 by the surveying instrument main body 3, a control of the light receiving module 26, a control of the distance measurement calculating module 27, a control of the optical axis deflector 35, a control of the measuring direction image pickup module 37, and the like, and carries out a search, a tracking, and the distance measurement of the object to be measured.

A description will be given on the optical axis deflector 35 by referring FIG. 3.

The optical axis deflector 35 is configured by a pair of optical prisms 57 and 58. Each of the optical prisms 57 and 58 has a disk shape with the same diameter and is disposed concentrically each other and crosses the distance measuring optical axis 53 at a right angle on the distance measuring optical axis (that is, the reference optical axis O) deflected by the second reflection mirror 48. Further, the optical prisms 57 and 58 are arranged in parallel at a predetermined interval.

The optical prisms 57 and 58 are formed from three triangular prisms arranged in parallel, respectively. Each of the triangular prisms is formed from an optical glass and has optical characteristics of the same deflection angle.

A width and a shape of each of the triangular prisms may be the same or may be different. The widths of the triangular prisms positioned at a center are larger than a beam diameter of the distance measuring light 49, and the distance measuring light 49 is adapted to transmit only a central part of the triangular prisms. It is to be noted that the triangular prisms in a surrounding may be constituted by a plurality of small triangular prisms.

Further, the triangular prisms at the center may be made of an optical glass with high accuracy, and the triangular prisms in the surrounding may be made of an optical plastic. That is because a distance from the optical axis deflector 35 to the object to be measured is large, optical characteristics of the central part of the triangular prisms require an accuracy, but on the other hand, a distance from each triangular prism in the surrounding to the photodetector 55 is small, and highly accurate optical characteristics are not required.

A central part of the optical axis deflector 35 is a distance measuring light deflector, which is a first optical axis deflector through which the distance measuring light 49 is transmitted and is projected. A portion excluding the central part of the optical axis deflector 35 (the triangular prisms in the surrounding) is a reflected distance measuring light deflector, which is a second optical axis deflector through which the reflected distance measuring light 52 is transmitted and enters.

The respective optical prisms 57 and 58 are arranged rotatably individually and independently around the reference optical axis O. The optical prisms 57 and 58 are controlled respectively by the arithmetic control module 28 regarding a rotating direction, a rotation amount and a rotating speed. Thereby, the optical prisms 57 and 58 deflect the projection optical axis 44 of the projected measuring light 49 in an arbitrary direction and also deflect the light receiving optical axis 51 of the received reflected distance measuring light 52 in parallel with the projection optical axis 44.

Further, when a rotation of the optical prisms 57 and 58 is continuously controlled and the transmitted distance measuring light 49 is continuously deflected while continuously irradiating the distance measuring light 49, the distance measuring light 49 can be scanned in a predetermined pattern. Further, three-dimensional distance measurement data is acquired along a scanning path (a scan locus).

Outer shapes of the optical prisms 57 and 58 are circular around the distance measuring optical axis 53 (the reference optical axis O), respectively, and diameters of the optical prisms 57 and 58 are set so that a sufficient light amount can be obtained by considering a spread of the reflected distance measuring light 52.

A ring gear 59 is fitted on an outer periphery of the optical prism 57, and a ring gear 60 is fitted on an outer periphery of the optical prism 58.

A driving gear 61 is meshed with the ring gear 59, and the optical prism 57 is rotated by a motor 63 via the driving gear 61 and the ring gear 59. Similarly, a driving gear 62 is meshed with the ring gear 60, and the optical prism 58 is rotated by a motor 64 via the driving gear 62 and the ring gear 60. The motors 63 and 64 are electrically connected to the motor driver 39.

As the motors 63 and 64, motors which are capable of detecting the rotation angle are used or motors which rotate corresponding to a driving input value such as a pulse motor, for instance, are used. Alternatively, a rotation angle detector for detecting rotation amounts (rotation angles) of the motors such as an encoder, for instance, may be used and the rotation amounts of the motors 63 and 64 may be detected by the rotation angle detector. The rotation amounts of the motors 63 and 64 are detected, respectively, and the motors 63 and 64 are individually controlled by the motor driver 39.

Further, rotation angles of the optical prisms 57 and 58 are detected via the rotation amounts of the motors 64 and 63, that is, rotation amounts of the driving gears 61 and 62. It is to be noted that the encoder may be attached directly to the ring gears 59 and 60, respectively, so that the rotation angles of the ring gears 59 and 60 are directly detected by the encoder.

The driving gears 61 and 62 and the motors 63 and 64 are provided at positions not interfering with the distance measuring light projecting module 25 such as at lower positions of the ring gears 59 and 60, for instance.

The projecting lens 46, the first reflection mirror 47, the second reflection mirror 48, the distance measuring light deflector and the like make up a projection optical system.

Further, the reflected distance measuring light deflector, the focusing lens 54 and the like make up a light receiving optical system.

The distance measurement calculating module 27 controls the light emitter 45 and makes the light emitter 45 pulse-emit or burst-emit (intermittently emit) the laser beam as the distance measuring light 49. The projection optical axis 44 (that is, the distance measuring optical axis 53) is deflected by a central part of the triangular prisms (the distance measuring light deflector) so that the distance measuring light 44 is directed toward the object to be measured 8. The distance measurement is performed in a state where the distance measurement optical axis 53 sights the object to be measured 8.

The reflected distance measuring light 52 reflected from the object to be measured 8 enters the light receiving module 26 through the triangular prisms in the surrounding (that is, the reflected distance measuring light deflector), and the reflected distance measuring light 52 is focused on the photodetector 55 by the focusing lens 54.

The photodetector 55 sends out the photodetecting signal to the distance measurement calculating module 27, the distance measurement calculating module 27 performs a distance measurement of a measuring point (a point irradiated with the distance measuring light) per each pulsed light based on the photodetecting signal from the photodetector 55, and the distance measurement data is stored in the storage module 29.

The projecting direction detecting module 38 counts driving pulses inputted into the motors 63 and 64 and detects the rotation angles of the motors 63 and 64. Alternatively, the projecting direction detecting module 38 detects the rotation angles of the motors 63 and 64 based on a signal from the encoder. Further, the projecting direction detecting module 38 calculates rotational positions of the optical prisms 57 and 58 based on the rotation angles of the motors 63 and 64.

Further, the projecting direction detecting module 38 calculates a deflection angle and a projecting direction (deflecting direction) of the distance measuring light 49 with respect to the reference optical axis O per each pulsed light based on refractive indexes of the optical prisms 57 and 58, the rotational position of when the optical prisms 57 and 58 are integrated, and a relative rotation angle between the both optical prisms 57 and 58 in real time. A calculation result (an angle measurement result) is associated with the distance measurement result and is inputted into the arithmetic control module 28. It is to be noted that in a case where the distance measuring light 49 is burst-emitted, the distance measurement is performed per each intermittent distance measuring light.

By controlling the rotating directions and the rotating speeds of the motors 63 and 64 and a rotation ratio between the motors 63 and 64, the arithmetic control module 28 controls a relative rotation and an entire rotation of the optical prisms 57 and 58 and controls a deflecting action by the optical axis deflector 35. Further, the arithmetic control module 28 calculates a horizontal angle and a vertical angle of the measuring point with respect to the reference optical axis O from the deflection angle and the projecting direction of the distance measuring light 49. Further, the arithmetic control module 28 associates the horizontal angle and the vertical angle regarding the measuring point with the distance measurement data and can acquire three-dimensional data of the measuring point. Thus, the surveying instrument main body 3 functions as a total station.

Further, a scanning can be performed in an arbitrary pattern within a range of a maximum deflection angle of the optical axis deflector 35 as described later.

Subsequently, a description will be given on the attitude detector 36. The attitude detector 36 detects tilt angles of the measuring instrument main body 3 with respect to the horizontal and the vertical, and the detection result is inputted to the arithmetic control module 28. It is to be noted that as the attitude detector 36, an attitude detector disclosed in Japanese Unexamined Patent Application Publication No. 2016-151423 can be used.

The attitude detector 36 will be described in brief. The attitude detector 36 has a frame 66. The frame 66 is fixed to the casing 41 or fixed to a structural component and is integrated with the surveying instrument main body 3.

A sensor block 67 is mounted on the frame 66 via a gimbal. The sensor block 67 is capable of rotating freely by 360° or over 360° in two directions around two axes crossing each other at a right angle, respectively.

A first tilt sensor 68 and a second tilt sensor 69 are mounted on the sensor block 67. The first tilt sensor 68 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 69 is a sensor which detects a tilt change with high responsiveness, for instance an acceleration sensor.

Each of relative rotation angles of the two axes of the sensor block 67 with respect to the frame 66 are configured to be detected by encoders 70 and 71, respectively.

Further, motors (not shown) which rotate the sensor block 67 in order to maintain the sensor block 67 horizontally are provided in relation with the two axes, respectively. The motors are controlled by the arithmetic control module 28 so that the sensor block 67 is maintained horizontally based on detection results from the first tilt sensor 68 and the second tilt sensor 69.

In a case where the sensor block 67 is tilted (in a case where the surveying instrument main body 3 is tilted), the relative rotation angle of each axial direction of the frame 66 with respect to the sensor block 67 (horizontal) is detected by the encoders 70 and 71, respectively. Based on the detection results of the encoders 70 and 71, the tilt angles of the surveying instrument main body 3 with respect to the two axes are detected and the tilt direction of the surveying instrument main body 3 is determined by synthesizing the tilts of the two axes.

The sensor block 67 is capable of rotating freely by 360° or over 360° with respect to the two axes and hence, whatever the attitude detector 36 takes any attitude or even if the attitude detector 36 is inverted upside down, for instance, the attitude detector 36 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 69, but the second tilt sensor 69 has a detection accuracy poorer than the first tilt sensor 68 in general.

The attitude detector 36 includes the first tilt sensor 68 with high accuracy and the second tilt sensor 69 with high responsiveness. Thereby, it is possible to perform the attitude control based on the detection result of the second tilt sensor 69 and further, to perform the attitude detection with high accuracy by the first tilt sensor 68.

The detection result of the second tilt sensor 69 can be calibrated based on the detection result of the first tilt sensor 68. That is, if the relationship between a detected tilt angle of the second tilt sensor 69 and a tilt angle, which is obtained based on the horizontal detection by the first tilt sensor 68 and the detection results of the encoders 70 and 71, is obtained in advance, the arithmetic control module 28 can calibrate the tilt angle detected by the second tilt sensor 69, and an accuracy of the attitude detection with high responsiveness by the second tilt sensor 69 can be improved based on this calibration. In a state where there is a small environmental change (a temperature or the like), the tilt detection may be performed based on the detection result of the second tilt sensor 69 and a correction value.

The arithmetic control module 28 controls the motors based on the signal from the second tilt sensor 69 when a tilt fluctuation is large and when the tilt change is rapid. Further, the arithmetic control module 28 controls the motors based on the signal from the first tilt sensor 68 when the tilt fluctuation is small and when the tilt change is mild, that is, in a state where the first tilt sensor 68 is capable of following up. It is to be noted that by calibrating the tilt angle detected by the second tilt sensor 69 at all times, the attitude detection by the attitude detector 36 may be performed based on the detection result from the second tilt sensor 69.

In the storage module 29, comparison data indicating a comparison result between the detection result of the first tilt sensor 68 and the detection result of the second tilt sensor 69 is stored. The detection result by the second tilt sensor 69 is calibrated based on the signal from the first tilt sensor 68. By this calibration, the detection result by the second tilt sensor 69 can be improved to the detection accuracy of the first tilt sensor 68. Thus, in the attitude detection by the attitude detector 36, high responsiveness can be realized while high accuracy is maintained.

The attitude detector 36 detects an attitude of the surveying instrument main body 3 in real time. Further, since the attitude of the surveying instrument main body 3 can be detected in real time, a measured value can be corrected based on a result detected by the attitude detector 36 in real time. Therefore, when installing the surveying instrument main body 3, a leveling is no longer required.

The measuring direction image pickup module 37 has a first image pickup optical axis 73 in a predetermined relationship with the reference optical axis O of the surveying instrument main body 3 and an image pickup lens 74 and an image pickup element 75 arranged on the first image pickup optical axis 73. The measuring direction image pickup module 37 is a camera having a field angle 50° to 60°, for instance, substantially equal to a maximum deflection angle θ/2 (±30°, for instance) of the optical prisms 57 and 58. The measuring direction image pickup module 37 can acquire a still image, a continuous image, and a video image.

The relationship among the first image pickup optical axis 73, the projection optical axis 44 and the reference optical axis O is already-known, the first image pick up optical axis 73, the projection optical axis 44 and the reference optical axis O are parallel with each other, and the distance between each of the optical axes has a known value.

The image pickup control module 31 controls an image pickup of the measuring direction image pickup module 37. In a case where the measuring direction image pickup module 37 picks up the video image or the continuous image, the image pickup control module 31 synchronizes a timing of acquiring a frame image constituting the video image or the continuous image with a timing of scanning by the surveying instrument main body 3 and of performing the distance measurement (the timing of measuring distance per a pulsed laser beam). The arithmetic control module 28 also performs associating the image with the measurement data (the distance measurement data, the angle measurement data).

The image pickup element 75 of the measuring direction image pickup module 37 is a CCD or a CMOS sensor which is an aggregate of pixels and each pixel can specify a position on the image pickup element 75. Each pixel has pixel coordinates in a coordinate system with the first image pickup optical axis 73 as an origin, for instance. The photodetecting signal from each pixel includes an information of the pixel coordinates. Therefore, a position of each pixel on the image pickup element 75 is specified by the pixel coordinates included in the photodetecting signal. Further, since the relationship between the first image pickup optical axis 73 and the reference optical axis O is already-known, a mutual association between the measuring position by the distance measuring unit 42 and the position on the image pickup element 75 can be made. An image signal outputted from the image pickup element 75 includes the information of the pixel coordinates. The image signal is inputted into the image processing module 32 via the image pickup control module 31.

A description will now be given on a deflecting action of the optical axis deflector 35 and a scanning action by referring to FIG. 3, FIG. 4A and FIG. 4B.

Figure 3:
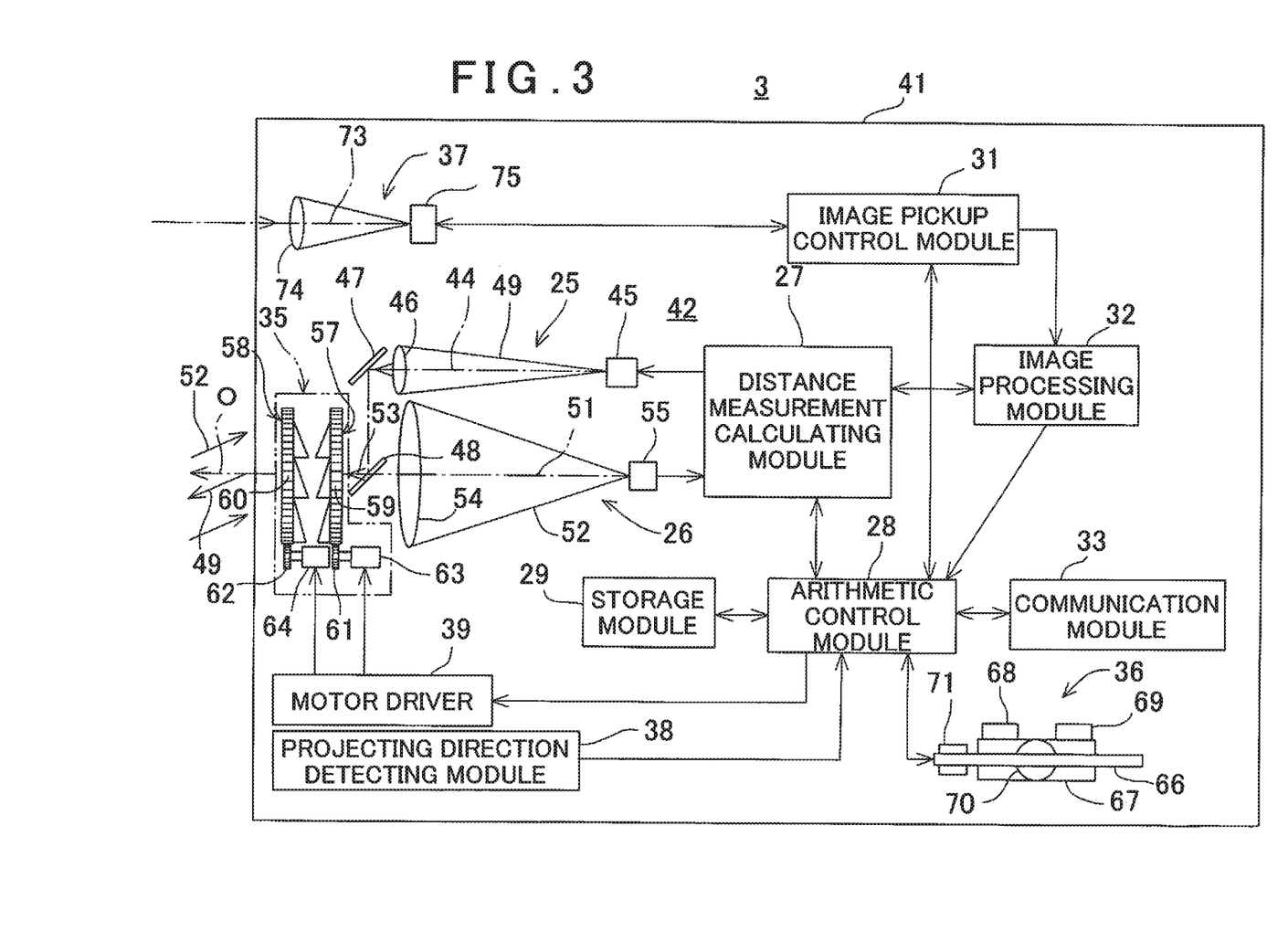
FIG. 3 is a schematical block diagram of the surveying instrument main body.

In a state of the optical prisms 57 and 58 (a state where directions of the optical prisms 57 and 58 are 180° different (when a relative rotation angle is 180°)) shown in FIG. 3, mutual optical actions of the optical prisms 57 and 58 are canceled out, and a deflection angle becomes 0°. Therefore, an optical axis (the distance measuring optical axis 53) of a laser beam, which is projected and received through the optical prisms 57 and 58, coincides with the reference optical axis O.

Further, in a state where any one of the optical prisms 57 and 58 is rotated 180° with respect to the other (the prisms have the same directions) from the state in FIG. 3, a maximum deflection angle (for instance, 30°) can be obtained.

Therefore, by a relative rotation between the optical prisms 57 and 58, the distance measuring optical axis 53 is deflected between 0° to 30°, and an integral rotation of the optical prisms 57 and 58 changes the deflecting direction.

Therefore, by controlling the relative rotation angle between the optical prisms 57 and 58 and an integral rotation angle of the optical prisms 57 and 58, the distance measuring optical axis 53 can be deflected in a maximum deflection angle range in an arbitrary direction. That is, the distance measuring optical axis 53 can be sighted to the object to be measured 8 in the arbitrary direction.

Further, by carrying out the relative rotation and the integral rotation of the optical prisms 57 and 58 while irradiating the distance measuring light 49, the distance measuring light 49 can be scanned in the arbitrary direction and with an arbitrary pattern.

Figure 4A:
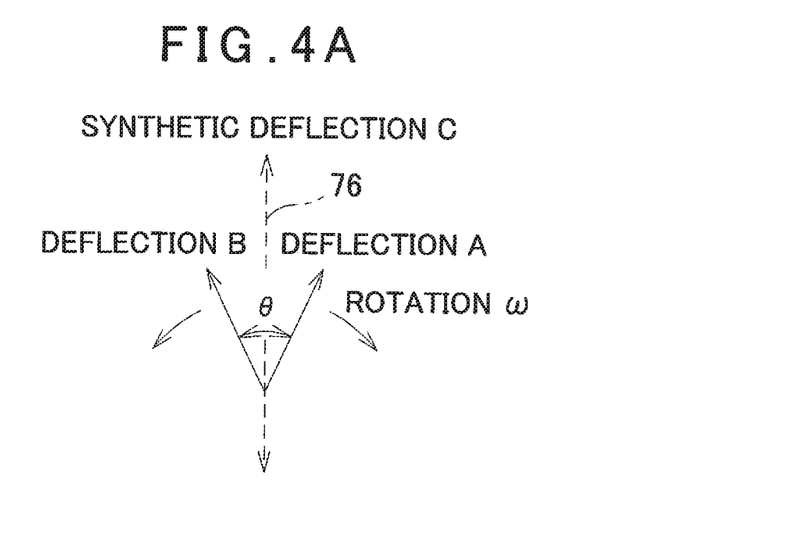
FIG. 4A and FIG. 4B are drawings to explain an action of an optical axis deflector.

For instance, as shown in FIG. 4A, assuming that a relative rotation angle between the optical prisms 57 and 58 is θ and a deflection A and a deflection B are obtained by the optical prisms 57 and 58 respectively, an actual deflection 76 of the distance measuring optical axis 53 becomes a synthetic deflection C, and a magnitude of a deflection angle is determined depending on the relative rotation angle θ. Therefore, when the optical prisms 57 and 58 are synchronously rotated forwardly and reversely at an equal speed, the distance measuring optical axis 53 (the distance measuring light 49) is linearly reciprocally scanned in a direction of the synthetic deflection C.

Further, when the optical prism 57 and the optical prism 58 are integrally rotated by the motors 63 and 64 in a state where the positional relationship between the optical prism 57 and the optical prism 58 is fixed (that is, in a state where the deflection angle as obtained by the optical prism 57 and the optical prism 58 is fixed), the distance measuring optical axis 53 (the distance measuring light 49) is scanned with a circle around the reference optical axis O (see FIG. 1).

Figure 4B:
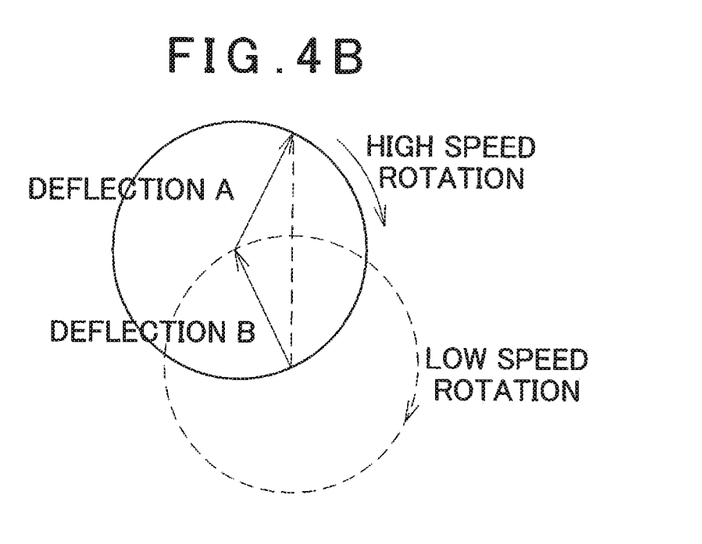

Further, as shown in FIG. 4B, when the optical prism 58 is rotated at a rotating speed lower than a rotating speed of the optical prism 57, the distance measuring light 49 is rotated while the angular difference 8 is gradually increased. Therefore, a scan locus of the distance measuring light 49 becomes spiral.

Further, by individually controlling the rotating directions and the rotating speeds of the optical prism 57 and the optical prism 58, various two-dimensional scan patterns of the scan locus of the distance measuring light 49 with the reference optical axis O as a center can be obtained.

Figure 5:
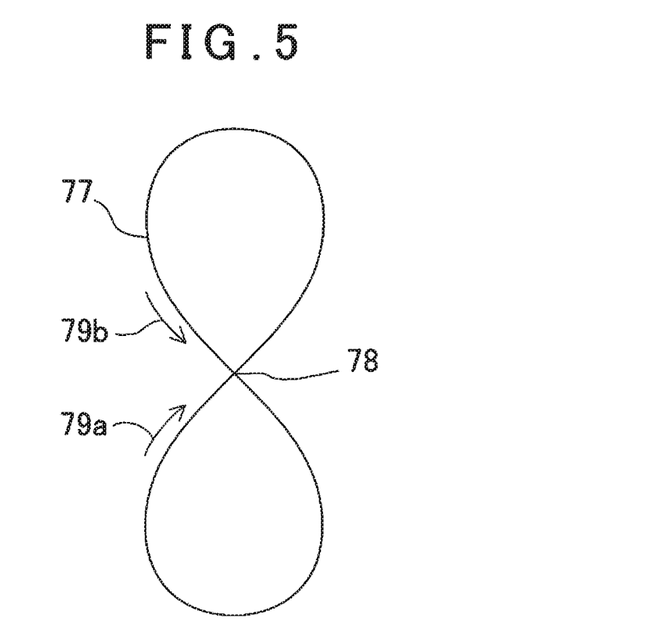
FIG. 5 is a drawing to show an example of a scan pattern.

For instance, when a rotation ratio of the optical prism 57 and the optical prism 58 is set to 1:2, a two-dimensional closed loop scan pattern 77 with a shape of numeral 8 as shown in FIG. 5 can be obtained. Further, the scan pattern 77 has an intersection 78 where an outward 79a crosses an inward 79b, and the intersection 78 is a center of the scan pattern 77 and coincides with the reference optical axis O.

Figure 6:
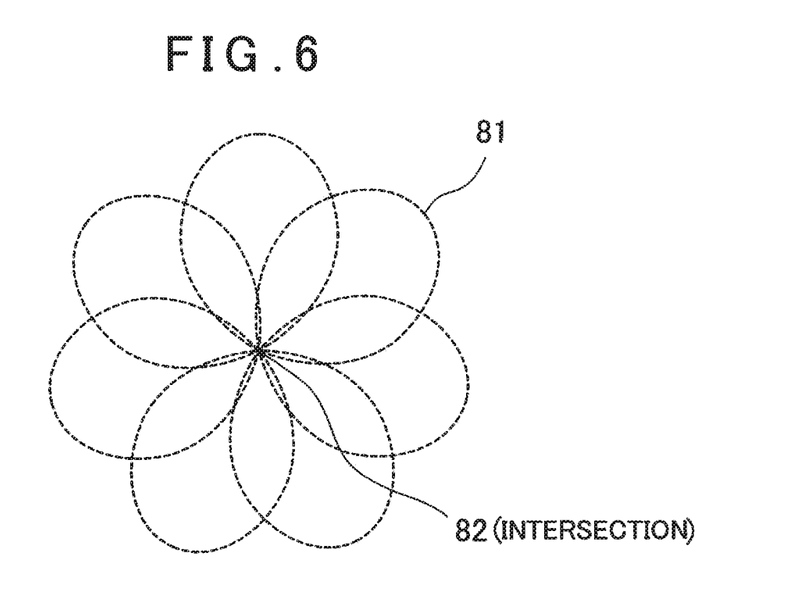
FIG. 6 is a drawing to show an example of the scan pattern.

Further, when the one optical prism 57 in the optical prism 57 and the optical prism 58 is rotated by 25 rotations and the other optical prism 58 is rotated by 5 rotations in the opposite direction, a flower petal-shaped two-dimensional closed loop scan pattern 81 (flower petal pattern 81 (a hypotrochoid curve)) as shown in FIG. 6 is obtained. The flower petal pattern 81 has also an intersection 82 at a center.

Further, a maximum range where a two-dimensional scan is possible in a state where the surveying instrument main body 3 is fixed is the maximum deflection angle range of the optical axis deflector 35.

Next, a description will be given on a measuring operation of the surveying system 1 according to the present embodiment.

As a preparation for starting a measurement, the target instrument 5 is captured by the measuring direction image pickup module 37. Since a field angle of the measuring direction image pickup module 37 is a wide field angle of 50° to 60°, it would suffice if the surveying instrument main body 3 approximately directs toward the target instrument 5. Further, since the maximum deflection angle of the optical axis deflector 35 is the same as or approximately the same as the field angle of the measuring direction image pickup module 37, when the measuring direction image pickup module 37 captures the target instrument 5, the target instrument 5 is captured in a searchable range of the surveying instrument main body 3.

In a state where the target instrument 5 is captured by the measuring direction image pickup module 37, a search and a sighting of the object to be measured 8 are carried out by the surveying instrument main body 3. While searching and sighting, the surveying instrument main body 3 is in a fixed state.

A scan pattern to search the object to be measured 8 is selected. The scan pattern may be set in advance or may be selected according to a shape and properties of the object to be measured 8 or according to a measurement state and the like.

For instance, as a pattern to search-scan an entire range of the maximum deflection angle range of the optical axis deflector 35, a spiral pattern as shown in FIG. 4B is selected. A movement of the optical prism 57 and a movement of the optical prism 58 are only rotations in one direction, the optical prisms 57 and 58 are light in weight, and hence a high-speed rotation is possible. Therefore, a high-speed scan (a high-speed search) is possible.

In a process of a search scan, when a scan line passes the object to be measured 8, the distance measuring light 49 is reflected by the object to be measured 8, and the reflected distance measuring light 52 is received by the light receiving module 26.

The arithmetic control module 28 obtains a deflection angle and a deflecting direction with respect to the reference optical axis O from the projecting direction detecting module 38 when the light receiving module 26 receives the reflected distance measuring light 52.

The arithmetic control module 28 controls the optical axis deflector 35 in such a manner that a deflection angle and a deflecting direction of the distance measuring optical axis 53 coincide with the deflection angle and the deflecting direction obtained from the projecting direction detecting module 38, that is, in such a manner that the distance measuring optical axis 53 sights the object to be measured 8.

In a state where the distance measuring optical axis 53 sights the object to be measured 8, the distance measurement is started, and three-dimensional coordinates of the measuring point P are determined from a measured position of the object to be measured 8 and an already-known relationship between the object to be measured 8 and the lower end of the pole 7.

In a case where the target instrument 5 is moved to a next measuring point, the target instrument 5 (that is, the object to be measured 8) is tracked by the surveying instrument main body 3.

As a tracking pattern to perform the tracking, a scan pattern to search-scan the entire range of the maximum deflection angle range can be adopted, and a local pattern, with which a predetermined range is scanned around a deflecting direction in which the reflected measuring light 52 is received, can be also adopted.

As the local pattern, there can be considered various types of patterns such as a spiral pattern, a multi-circle pattern, a single-circle pattern, an elliptic pattern, a pattern to integrally reciprocally rotate the optical prisms 57 and 58 while performing a reciprocal scan (see FIG. 4A), and the like.

When the reflected distance measuring light 52 is detected while executing the search scan by the local pattern (hereinafter a local search scan), the optical axis deflector 35 is controlled by the arithmetic control module 28 in such a manner that the deflecting direction (including a deflection angle and a direction of the deflection angle), in which the reflected distance measuring light 52 is detected, becomes an approximate center of the local pattern (that is, the local search scan) (here, the approximate center includes a center or the approximate center).

In a case where the reflected distance measuring light 52 is not detected by executing the local pattern, the local search scan shifts to the search scan of the entire range of the maximum deflection angle range. As described above, since the maximum deflection angle of the optical axis deflector 35 is a wide range of 50° to 60°, the target instrument 5 does not go out from the maximum deflection angle in a normal measurement work. Therefore, when the search scan of the entire range of the maximum deflection angle range is executed, the object to be measured 8 can be assuredly captured. Further, as described above, since the search scan of the entire range of the maximum deflection angle range can be executed at a high speed, even if the tracking is temporarily discontinued, the tracking can be recovered promptly.

Next, in a case where a measurement range is a wide range and the movement of the target instrument 5 exceeds the field angle of the measuring direction image pickup module 37 (the maximum deflection angle of the optical axis deflector 35), the target instrument 5 is tracked by a cooperation of the tracking by the optical axis deflector 35 and the rotation of the surveying instrument main body 3 by the installation base 4.

For instance, when the reflected distance measuring light 52 is detected by an entire range search scan or the local search scan, at this moment, the deflecting direction of the distance measuring optical axis 53 with respect to the reference optical axis O is obtained by the projecting direction detecting module 38, and the arithmetic control module 28 drives the horizontal motor 16 and the vertical motor 21 based on the deflecting direction in the direction where a center of the search scan coincides with the reference optical axis O.

In this case, since the tracking is performed by the optical axis deflector 35 first, there is no change in performing a rapid tracking. Therefore, the tracking by the installation base 4 may be performed at a low speed, and when the tracking by the installation base 4 is carried out as well, a wide range tracking can be performed exceeding the field angle of the measuring direction image pickup module 37.

It is to be noted that the scan pattern of the search scan may be flat in the horizontal direction in a tracking state, and the scan pattern of the search scan may be a vertically elongated scan pattern at an end of the tracking so that a tracking efficiency can be improved.

Thus, the surveying system 1 has functions equivalent to functions of the total station with a tracking function.

Figure 7:
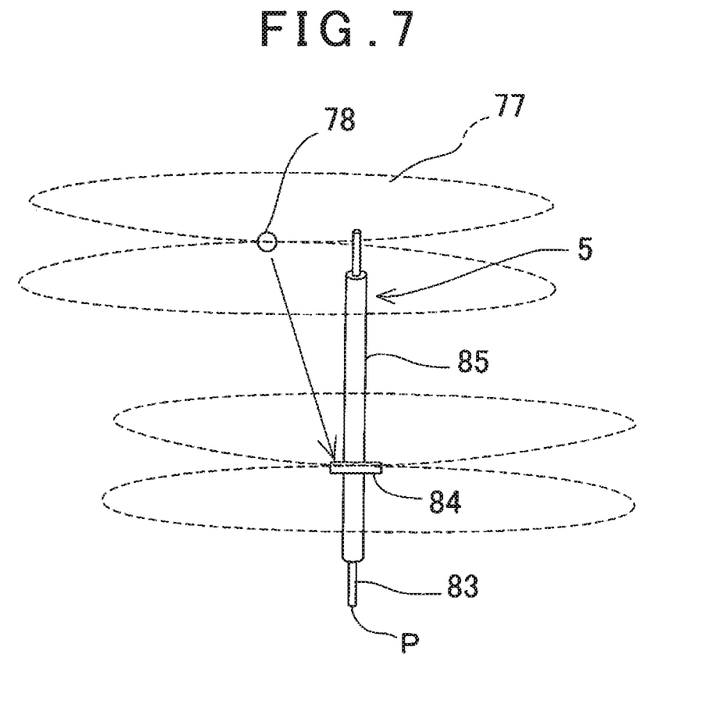
FIG. 7 is an explanatory drawing to show a relationship between a scan pattern and a target instrument in a second embodiment of the present invention.
Figure 8:
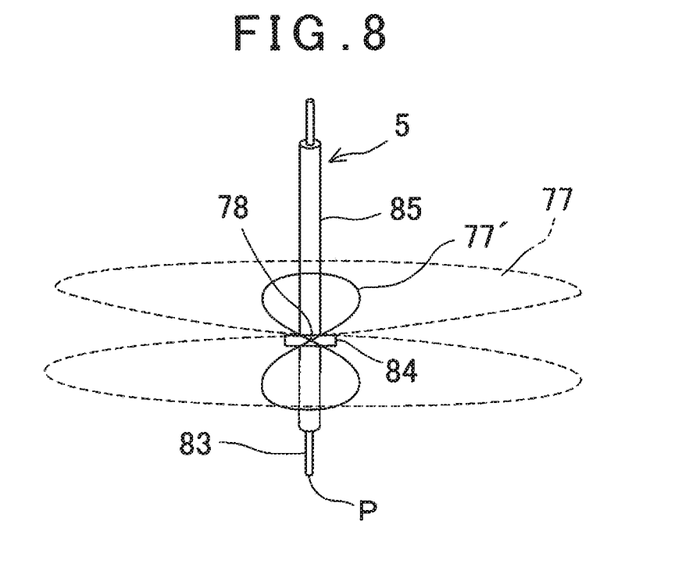
FIG. 8 is an explanatory drawing to show the relationship between the scan pattern and the target instrument in the second embodiment of the present invention.

Next, a description will be given on a second embodiment. FIG. 7 and FIG. 8 show a target instrument 5 used in the second embodiment.

The target instrument 5 has a pole 83 which is a rod-like supporting member with a circular cross section, and a reference reflection part 84 provided in a middle of the pole 83. The reference reflection part 84 is a circular concentrically with the pole 83, and a reflection sheet as a retro-reflector is wound around an entire circumference of the reference reflection part 84.

A reflection sheet as a retro-reflector is wound around the pole 83 so as to cover the entire circumference in such a manner that the pole 83 is partially exposed above and below respectively. The part where the reflection sheet is wound around constitutes a linear reflection part 85 with a predetermined length in an up-and-down direction. Each of the reference reflection part 84 and the linear reflection part 85 reflects a distance measuring light respectively, and becomes an object to be measured of a surveying system 1. As opposed to the reference reflection part 84 as a target showing a reference point (to be described later), the linear reflection part 85 is an auxiliary reflection part which facilitates the detecting of the object to be measured and further, the detecting of the reference reflection part 84.

A lower end of the pole 83 is designed as a tip capable of indicating a measuring point P.

The target instrument 5 has a reference point at a predetermined position from the lower end of the pole 83. The reference reflection part 84 is provided on the pole 8, and a center of the reference reflection part 84 is the reference point. Further, regarding the reference point, a distance from the lower end of the pole 83 is already known.

Similarly to the linear reflection part 85, a reflection sheet is wound around the reference reflection part 84 in the entire circumference. The reference reflection part 84 has a predetermined thickness (a length in an axial direction) larger than a beam diameter of the distance measuring light and is larger with respect to a diameter of the linear reflection part 85.

Here, a diameter difference between the reference reflection part 84 and the linear reflection part 85 is determined in accordance with a measurement accuracy of a surveying instrument main body 3, and ½ of this diameter difference, that is, a radius difference only needs to be the measurement accuracy (a measurement error) or more of the surveying instrument main body 3. That is, it would suffice if it is possible to distinguish the reference reflection part 84 and the linear reflection part 85 based on the measurements results of the reference reflection part 84 and the linear reflection part 85. Further, it is needless to say that the diameter difference is determined in accordance with the diameter of the linear reflection part 85, a measurement condition, a measurement capability of the surveying instrument main body 3 and the like.

In a case of the present embodiment, assuming that a measured distance is 200 m at maximum, the diameter of the linear reflection part 85 is set to 35 mm, the diameter of the reference reflection part 84 is set to 100 mm, and the thickness of the reference reflection part 84 is set to 30 mm.

Also in the present embodiment, a two-dimensional search scan is carried out by a control of an optical deflector 35. Further, in the two-dimensional search scan, an initial search scan with a wide search range and a local search scan limited to a narrow range including the object to be measured are executed. First, the initial search scan for detecting the target instrument 5 is executed.

In a description as given below, a two-dimensional scan pattern 77 with a shape of numeral 8 is adopted as a search scan pattern.

A shape of the scan pattern 77 in the initial search scan at a start of a search has a flat shape of numeral 8 in a horizontal direction, as shown in FIG. 7. It is to be noted that, in the initial search scan, it is preferable to have a flat shape in the horizontal direction regardless of the shape of the scan pattern.

Since the linear reflection part 85 is elongated in a vertical direction, by flattening the scan pattern 77, a high-speed search in a wide range can be performed. Further, when a path of the scan pattern 77 in the initial search scan crosses the linear reflection part 85, since a reflected distance measuring light 52 from the linear reflection part 85 can be obtained, the search need not to be densely performed in an entire range of the search range, and it would suffice if the same scan pattern is continuously performed as shown in FIG. 7.

Further, in the present embodiment, although the scan pattern 77 with a shape of numeral 8 is adopted as a scan pattern for performing the initial search scan, the scan pattern may be a circular pattern, an elliptic pattern which is flat in the horizontal direction, or a linear pattern which linearly reciprocates in the horizontal direction, since it would suffice if a path of the scan pattern crosses the linear reflection part 85.

Although an arithmetic control module 28 controls the optical axis deflector 35 and performs the initial search scan, since the arithmetic control module 28 also performs a distance measurement and an angle measurement while carrying out the scan pattern 77, a deflecting direction is detected and a distance measurement to the linear reflection part 85 is performed based on the reflected distance measuring light 52 from the linear reflection part 85 at a moment of when the scan pattern crosses the linear reflection part 85. Therefore, three-dimensional coordinates of a point at which the scan pattern crosses the linear reflection part 85 are obtained.

Further, the arithmetic control module 28 calculates a horizontal deflection angle and a deflecting direction of the point at which the scan pattern crosses the linear reflection part 85 (hereinafter a cross point) with respect to the reference optical axis O. A horizontal angle between the cross point and a center of the scan pattern is obtained, and the arithmetic control module 28 controls the optical axis deflector 35 in such a manner that the scan pattern 77 moves in a direction which the horizontal angle decreases.

Further, in a case where two or more reflected distance measuring lights 52 are obtained from the target instrument 5, measurements are respectively performed based on photodetecting signals obtained from the two or more reflected distance measuring lights 52, distance measurement results as obtained are averaged, and the optical axis deflector 35 is controlled based on an average value.

In concurrence with a movement of the scan pattern 77 in the horizontal direction, the scan pattern 77 is also moved in an up-and-down direction so that the scan pattern 77 detects the reference reflection part 84. It is to be noted that whether the scan pattern 77 is to be moved downward or moved upward can be judged by detecting which position on the scan pattern 77 crosses the linear reflection part 85. In the drawing, the scan pattern 77 is moved downward.

The arithmetic control module 28 moves an intersection 78 along the linear reflection part 85 until the reference reflection part 84 is detected by the scan pattern 77 (in FIG. 7, the intersection 78 is moved downward). Here, since the reference reflection part 84 is protruded in the radius direction than the linear reflection part 85, the reference reflection part 84 can be detected by a change in the distance measurement result.

When the reference reflection part 84 is detected by the scan pattern 77, the arithmetic control module 28 changes the scan pattern 77 to a two-dimensional local scan pattern 77' suitable for a detection of a central position of the reference reflection part 84 (see FIG. 8). The local scan pattern 77' has a narrow search range and has a vertically elongated shape. It is to be noted that it is preferable to have a vertically elongated shape in the local search scan, regardless of the shape of the scan pattern.

When an intersection 78 of the local scan pattern 77' comes near the center of the reference reflection part 84, the local scan pattern 77' passes an edge of the reference reflection part 84. A position of the intersection 78 with respect to the reference reflection part 84 can be measured based on measurement results of passing points of this edge, and the intersection 78 can be coincided with the center of the reference reflection part 84.

When the intersection 78 is coincident with the center of the reference reflection part 84, the distance measuring optical axis 53 is sighted to the center of the reference reflection part 84, and the measurement of the reference reflection part 84 is executed. Further, based on a relationship between the reference reflection part 84 and the lower end of the pole 83, three-dimensional coordinates of the measuring point P are calculated.

Further, by an execution of the local scan pattern 77', the three-dimensional coordinates of upper and lower measuring points, when the local scan pattern 77' crosses the linear reflection part 85, are measured. Based on the three-dimensional coordinates of the upper and lower measuring points, inclining directions and inclination angles of the pole 83 in the front and rear direction and in the left and right direction can be measured. Further, the measurement result of the measuring point P can be corrected based on the inclining directions and the inclination angles of the pole 83 and the relationship between the reference reflection part 84 and the lower end of the pole 83.

Further, the inclination of the pole 83 obtained here is an inclination with respect to the distance measuring optical axis 53, and the distance measuring optical axis 53 itself is not necessarily horizontal. The tilt angle and the tilt direction of the distance measuring optical axis 53 with respect to the reference optical axis O can be measured by the projecting direction detecting module 38. Further, the tilt angle and the tilt direction of the reference optical axis O with respect to the horizontal can be measured by the attitude detector 36.

Therefore, the tilt angle and the tilt direction of the pole 83 with respect to the horizontal or the vertical can be also measured. Therefore, a distance, an elevation angle and the horizontal angle can be accurately measured with respect to an accurate measuring point (a point indicated by the lower end of the pole 83) P regardless of the tilt of the pole 83 by correcting the measurement result based on the tilt angle and the tilt direction of the pole 83 with respect to the horizontal or the vertical.

Therefore, even in the measurement of a place where the target instrument 5 cannot be supported upright such as a corner of a wall, a corner of a ceiling or the like, for instance, an accurate measurement is possible if the measuring point can be indicated by using the lower end of the pole 83 (in a case where the ceiling is measured, by an upper end of the pole 83).

When a measurement at the measuring point P is completed, the target instrument 5 is moved to a measuring point to be measured next.

In a case where the target instrument 5 is moved to the next measuring point, the local scan is continuously carried out with the local scan pattern 77' during the movement. The local scan is continued, the reference reflection part 84 is continuously detected, a deflection angle direction at a time of the detection is obtained, the local scan pattern 77' is moved in this deflection angle direction, and thus the reference reflection part 84 is tracked.

Further, in a case where the reference reflection part 84 goes out from the local scan pattern 77' and the reflected distance measuring light 52 from the reference reflection part 84 cannot be detected, the local search scan shifts to the initial search scan. In the initial search scan, the reflected distance measuring light 52 from the linear reflection part 85 can be detected in a wide range, and it is possible to easily recover a tracking state of the reference reflection part 84.

According to the present embodiment, it is only necessary that the scan pattern 77 crosses the linear reflection part 85 during the movement of the target instrument 5, and the tracking can be executed easily and reliably. Further, even if the tracking is discontinued due to an obstacle passing between the surveying instrument main body 3 and the target instrument 5 or the like, it is possible to recover easily.

In the embodiment as described above, the surveying instrument main body 3 is used as the total station, but the surveying instrument main body 3 can be also used as a laser scanner.

As described above, when a measurement is continuously performed in a state where the distance measuring light is scanned by the optical axis deflector 35, point cloud data can be acquired along a scan locus. For instance, when data is acquired while scanning with a flower petal pattern 81 shown in FIG. 6, the point cloud data can be acquired. Further, in a case where a point cloud density in the flower petal pattern 81 is desired to be increased, the optical axis deflector 35 could be controlled in such a manner that the flower petal pattern 81 rotates around the intersection 82. It is to be noted that a pattern to acquire the point cloud data is not limited to the flower petal pattern 81, and a scan with an arbitrary pattern can suffice.

Figure 9:
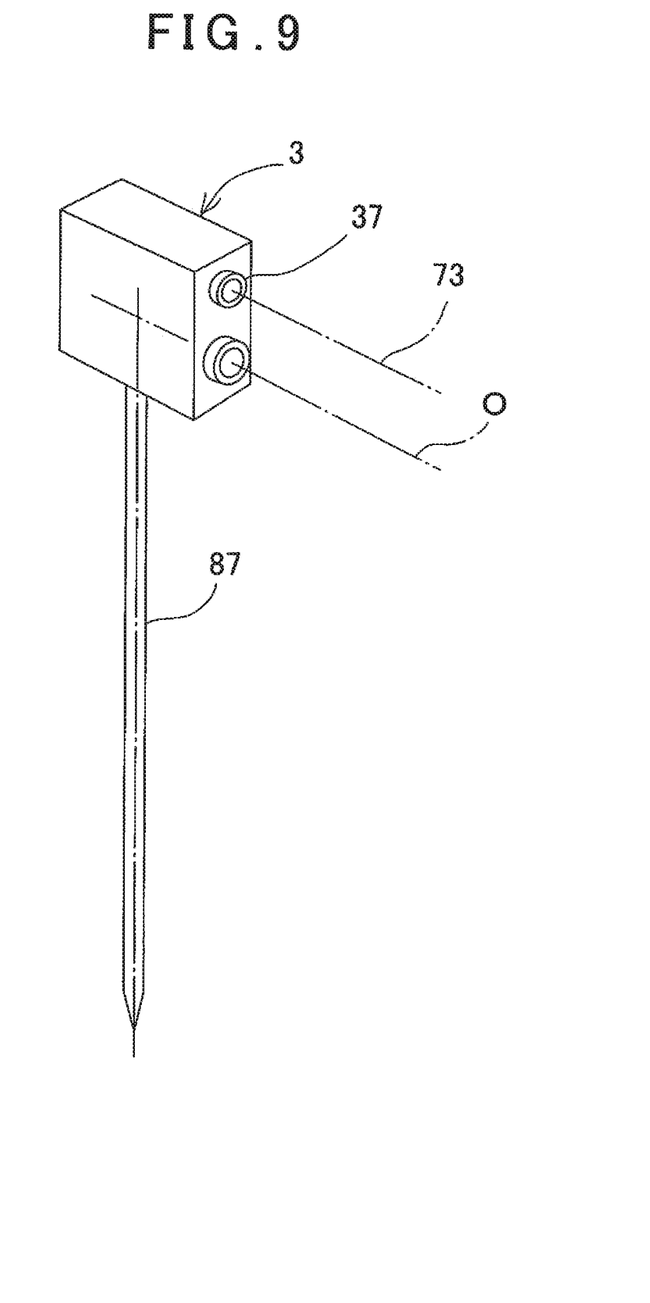
FIG. 9 is a schematical perspective view of a surveying system in a third embodiment of the present invention.

FIG. 9 shows a third embodiment.

In the third embodiment, a case where a surveying instrument main body 3 is provided at an upper end of a pole 87 is shown.

When the surveying instrument main body 3 is supported via the pole 87, the surveying instrument main body 3 is held in a relatively stable state. Further, since the surveying instrument main body 3 includes an attitude detector 36, even if the surveying instrument main body 3 tilts, a measurement result can be corrected based on a detection result of the attitude detector 36, and a measurement can be performed with high accuracy.

In the third embodiment, likewise, it is needless to say that the surveying system can be used as a total station or a laser scanner.

The invention claimed is:

1. A surveying system comprising an object to be measured having a retro-reflector and a surveying instrument main body for emitting a distance measuring light and performing a measurement of said object to be measured based on a reflected distance measuring light from said retro-reflector, wherein said surveying instrument main body comprises a distance measuring light projecting module which has a light emitter for emitting said distance measuring light and projects said distance measuring light onto a distance measuring optical axis, a light receiving module which has a photodetector for receiving said reflected distance measuring light and producing a photodetecting signal, a measuring unit which performs a distance measurement of said object to be measured based on said photodetecting signal from said photodetector, an optical axis deflector which has a reference optical axis and deflects said distance measuring optical axis with respect to said reference optical axis, a projecting direction detecting module which detects a deflection angle and a deflection angle direction of said distance measuring optical axis with respect to said reference optical axis, and an arithmetic control module which controls a deflecting action of said optical axis deflector and a distance measuring operation of said measuring unit, wherein said optical axis deflector comprises a pair of optical prisms which are rotatable around said reference optical axis and motors which individually independently rotate said optical prisms, and wherein said arithmetic control module is configured to control a deflection by said optical axis deflector by controlling a rotating direction, a rotating speed, and a rotation ratio of said pair of optical prisms, to perform a two-dimensional scan with said distance measuring light with said distance measuring optical axis as an approximate center, to detect said deflection angle direction of said distance measuring light at a moment of detecting said photodetecting signal during said two-dimensional scan by said projecting direction detecting module, and to control said optical axis deflector in such a manner that the approximate center of said two-dimensional scan moves in said detected deflection angle direction, wherein, in a case where two or more photodetecting signals are detected during said two-dimensional scan, said arithmetic control module averages said deflection angle directions detected by said projecting direction detecting module based on each of said photodetecting signals and controls said optical axis deflector in such a manner that said approximate center of said two-dimensional scan moves in an averaged deflection angle direction.

2. The surveying system according to claim 1, wherein said arithmetic control module moves a predetermined two-dimensional scan pattern in at least one of a horizontal direction and a vertical direction and searches said object to be measured while scanning with said predetermined two-dimensional scan pattern.

3. The surveying system according to claim 1, wherein said arithmetic control module is configured to control said optical axis deflector in such a manner that a two-dimensional scan pattern is moved in a vertical direction as an initial search pattern which is flat in a horizontal direction at a start of searching for said object to be measured and said initial search pattern is changed to a search pattern which is flat in a vertical direction after detecting said object to be measured.

4. The surveying system according to claim 1, wherein said optical axis deflector is configured to control said two-dimensional scan with a scan pattern having an intersection at which an outward and an inward of said two-dimensional scan cross each other.

5. The surveying system according to claim 1, wherein said arithmetic control module is configured to detect said photodetecting signal while performing said two-dimensional scan and to track said object to be measured based on a detection result.

6. The surveying system according to claim 5, wherein said arithmetic control module is configured to control said optical axis deflector in such a manner that a two-dimensional scan pattern becomes a scan pattern which is flat in a horizontal direction in a state where said object to be measured is tracked and said two-dimensional scan pattern becomes a scan pattern which is flat in a vertical direction after an end of a tracking.

* * * * *